(12) United States Patent
Maeda et al.

(10) Patent No.: US 9,071,112 B2
(45) Date of Patent: Jun. 30, 2015

(54) SQUIRREL-CAGE ROTOR AND PRODUCTION METHOD THEREOF

(75) Inventors: Hisashi Maeda, Yamanashi (JP); Masamoto Fukuda, Yamanashi (JP); Takafumi Kajiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 13/437,185

(22) Filed: Apr. 2, 2012

(65) Prior Publication Data

US 2012/0248901 A1    Oct. 4, 2012

(30) Foreign Application Priority Data

Apr. 4, 2011 (JP) ................ 2011-083060

(51) Int. Cl.
*H02K 15/00* (2006.01)
(52) U.S. Cl.
CPC .............. *H02K 15/0012* (2013.01)
(58) Field of Classification Search
CPC ..... H02K 17/165; H02K 17/16; H02K 17/20; H02K 15/0012
USPC ......... 310/44, 125, 211, 212, 156.78, 156.81; 29/598
See application file for complete search history.

(56) References Cited

U.S. PATENT DOCUMENTS

| | | | |
|---|---|---|---|
| 3,433,981 A | 3/1969 | Bollee | |
| 5,625,243 A | 4/1997 | Lindgren et al. | |
| 5,936,323 A | 8/1999 | Shibukawa et al. | |
| 2008/0296993 A1 | 12/2008 | Weihrauch | |
| 2011/0316380 A1* | 12/2011 | Buttner et al. | ................ 310/211 |

FOREIGN PATENT DOCUMENTS

| | | |
|---|---|---|
| CH | 460154 A | 7/1968 |
| CN | 200966020 Y | 10/2007 |
| DE | 890226 B | 9/1953 |
| DE | 936054 B | 12/1955 |
| DE | 975420 B | 11/1961 |
| DE | 1563041 A1 | 8/1970 |

(Continued)

OTHER PUBLICATIONS

JPO website translation of JP 2003244912 A, Hasegawa K et al., induction generator used in small sized gas turbine, has recess which is integrated with step according to counter diffusion and outer surface is formed smoothly, all pages.*

(Continued)

*Primary Examiner* — Naishadh Desai
(74) *Attorney, Agent, or Firm* — Lowe Hauptman & Ham, LLP (57) ABSTRACT

A squirrel-cage rotor and a production method thereof, the rotor having conductors with sufficient strength. In the invention, conductor particles are sprayed onto a core and/or conductive bars in a solid-state. As a result, in the coating material, the enlargement of the crystal grain of the conductors is significantly restricted, whereby conductive end rings are connected to the core and/or the conductive bars. Since conductor particles do not melt, a gap formed by thermal contraction when the conductor melts between different kinds of members is prevented from being formed. Therefore, the deterioration of the conductor may be limited, and the conductor may have sufficient strength. The reliability of the rotor is improved.

12 Claims, 8 Drawing Sheets

(56) References Cited

FOREIGN PATENT DOCUMENTS

| | | |
|---|---|---|
| DE | 69309576 T2 | 9/1997 |
| DE | 102008026963 A1 | 12/2008 |
| DE | 102009053666 A1 | 7/2010 |
| EP | 0583994 A1 | 2/1994 |
| EP | 0744813 A2 | 11/1996 |
| GB | 1427818 A | 3/1976 |
| JP | 2-193552 A | 7/1990 |
| JP | 02193552 A * 7/1990 ............ H02K 17/16 |
| JP | 2002-142421 A | 5/2002 |
| JP | 2003-230261 A | 8/2003 |
| JP | 2003-244912 A | 8/2003 |
| JP | 2003244912 A * 8/2003 ............ H02K 17/42 |
| JP | 4560755 B2 | 10/2010 |
| JP | 2011010498 A | 1/2011 |
| JP | 2012-19634 A | 1/2012 |
| WO | WO 2010100007 A1 * 9/2010 ............ H02K 17/16 |

OTHER PUBLICATIONS

Machine translation of JP 02-193552.*
Machine translation of JP 2003-244912.*
JP Office Action, dated Jul. 17, 2012, issued in JP Application No. 2011-083060.
Kazuhiko Sakaki, "Overview of cold spray technology and cold sprayed light metals coatings", Journal of Japan Institute of Light Metals, vol. 56, No. 7 (2006), pp. 376-385.
Yoshiyasu Itoh et al., "Mechanical Properties of Aluminum Coatings Produced by Cold Spraying", Journal of the Society of Materials Science, Japan, vol. 56, No. 6, pp. 550-555, Jun. 2007.
Office Action corresponding to CN201210053669.8, dated Feb. 20, 2013.
Office Action dated Jan. 28, 2015, corresponding to German patent application No. 102012006248.6.

* cited by examiner

SQUIRREL-CAGE ROTOR AND PRODUCTION METHOD THEREOF

RELATED APPLICATIONS

The present application is based on, and claims priority from, Japanese Application No. 2011-083060, filed Apr. 4, 2011, the disclosure of which is hereby incorporated by reference herein in its entirety.

BACKGROUND OF THE INVENTION

1. Field of the Invention

The present invention relates to a squirrel-cage rotor used for an induction motor, for example, and a production method thereof.

2. Description of the Related Art

For example, Japanese Unexamined Patent Publication (Kokai) No. 2011-10498 discloses a squirrel-cage induction motor having a rotor core, a large number of rotor slots formed at intervals near the outer periphery of the rotor core, rotor conductors embedded in the rotor slots, and conductive end rings arranged on both ends of the rotor core. The rotor core has end plates on both ends of electromagnetic steel plate, and the area of the rotor slots in the end plates is larger than the area of the rotor slots in the electromagnetic steel plate.

Japanese Patent Publication No. 4560755 discloses a production method for a rotor of an induction motor, wherein, a pair of end rings, radially extending along the outer periphery surface of a rotor core, are formed by thermal spraying. In the thermal spraying, a melted conductor such as melted copper is sprayed onto the outer periphery surface of the core at high speed. Then, the conductor is instantly cooled, whereby a conductive coating is formed on the outer periphery surface of the core. By means of the conductive coating, a conductive end ring is formed on the core.

In "Overview of cold spray technology and cold sprayed light metals coatings" (Journal of Japan Institute of Light Metals, Vol. 56, No.7 (2006), pp.376-385) by Sakaki, it is described that "in cold spray, gas, the temperature of which is lower than the melting point or the softening temperature of powder material, flows in a Laval nozzle (or a convergent-divergent nozzle) so as to make a hypersonic flow, as shown in FIG. 2. Then, the particulate material is accelerated by being poured into the hypersonic flow, and the solid-state particulate material collides with a substrate at high speed so as to form a coating on the substrate."

In "Mechanical Properties of Aluminum Coatings Produced by Cold Spraying" (Journal of the Society of Materials Science, Japan, Vol. 56, No.6, pp.550-555, June 2007) by Itoh et al., it is described that "the density of a cold sprayed coating is slightly lower than that of a pure milled aluminum, and the porosity of the cold sprayed coating is 2.52%. The density of an atmosphere plasma-sprayed coating is lower than that of the cold sprayed coating, and the porosity of the plasma-sprayed coating is 7.49%. The Young's modulus of the cold sprayed coating is significantly larger than that of the plasma-sprayed coating, and is generally equal to 80% of the Young's modulus of the pure milled aluminum."

In the thermal spraying of the prior art, the conductor must be instantly cooled after being melted. However, it is difficult to control the rate of cooling. Depending on the rate of cooling, the grain size of the conductor may be excessively increased (in other words, annealing occurs). Such increased grain size may cause degradation of the formed conductor. As a result, the conductive end ring cannot have sufficient strength, and the rotor having such an end ring is not reliable.

SUMMARY OF THE INVENTION

In view of the above problems the object of the present invention is to provide a squirrel-cage rotor, a conductor of which has sufficient strength, and a production method thereof.

One aspect of the present invention provides a squirrel-cage rotor, comprising: a core; a plurality of slot holes formed in the core and extending along a rotation axis of the core; conductive bars arranged in the slot holes; and a pair of conductive end rings arranged at both ends of the core and connected to each other by means of the conductive bars, wherein at least one of the conductive bars and the pair of conductive end rings are configured by a coating material which is formed by spraying a solid-state conductor particles.

In a preferred embodiment of the rotor, the slot holes are opened at an outer periphery surface of the core or are formed in the core, and the conductive bars are formed by the coating material of the conductor particles which are sprayed into the slot holes.

In a preferred embodiment of the rotor, the conductive end rings are formed by the coating material of the conductor particles which are sprayed to the core and the rotation axis from the side of the outer periphery surface of the core. Alternatively, the conductive end rings are formed by the coating material of the conductor particles which are sprayed toward the rotation axis from the side of an end surface of the core.

In a preferred embodiment of the rotor, the slot holes spirally extend about the rotation axis.

Another aspect of the present invention provides a production method of a squirrel-cage rotor including: a core; a plurality of slot holes formed in the core and extending along a rotation axis of the core; conductive bars arranged in the slot holes; and a pair of conductive end rings arranged at both ends of the core and connected to each other by means of the conductive bars, wherein the method comprises a step of configuring at least one of the conductive bars and the pair of conductive end rings by spraying a solid-state conductor particles so as to form a coating material.

In a preferred embodiment of the method, the slot holes are opened at an outer periphery surface of the core or are formed in the core, and the conductor particles are sprayed into the slot holes when the conductive bars are formed.

In a preferred embodiment of the method, the conductor particles are sprayed toward the rotation axis of the core from the side of the outer periphery surface of the core when the conductive end rings are formed. Alternatively, the conductor particles are sprayed toward an end surface of the core from the rotation axis of the core when the conductive end rings are formed.

In a preferred embodiment of the method, the slot holes spirally extend about the rotation axis.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
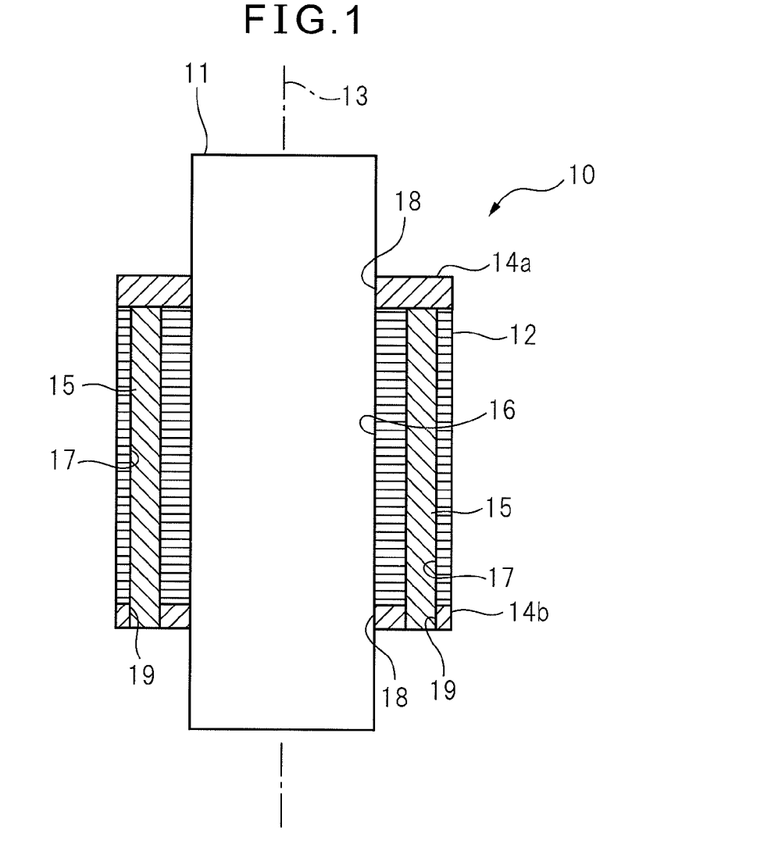
FIG. 1 is a sectional view of a squirrel-cage rotor according to a first embodiment of the invention, along a rotation axis thereof.
Figure 2:
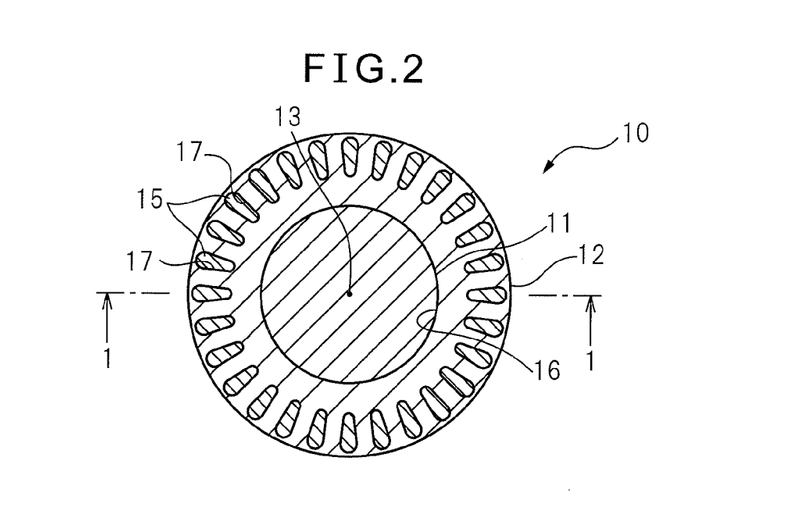
FIG. 2 is a sectional view of the squirrel-cage rotor according to the first embodiment of the invention, perpendicular to the rotation axis thereof.

Hereinafter, an embodiment of the present invention will be explained with reference to the drawings. FIG. 1 is a sectional view of a squirrel-cage rotor 10 according to a first embodiment of the invention, along a rotation axis of rotor 10, and FIG. 2 is a sectional view of rotor 10, perpendicular to the rotation axis of rotor 10. Squirrel-cage rotor 10 is attached to a rotation shaft 11 (for example, a column shaft). Rotor 10 has a cylindrical core 12, a pair of conductive annular end rings 14a, 14b positioned at both ends of core 12 in relation to the direction of a rotation shaft 11 (or a rotation axis 13 of core 12) so that the end rings sandwich core 12, and a plurality of conductive bars 15 extending through core 12 in the direction parallel to rotation axis 13.

Squirrel-cage rotor 10 used as a rotor of an induction motor is known. When rotor 10 is incorporated in the induction motor, a stator is positioned for generating a rotating magnetic field around rotor 10 about rotation axis 13. For example, in a multiphase induction motor, induced current is generated in a conductor of rotor 10 due to inductive effect of the rotating magnetic field generated by AC power. By the induced current and magnetic flux of the rotating magnetic field, rotating force is generated in rotor 10. In addition, the stator is not illustrated in the drawings.

Core 12 is formed by a laminated body produced by laminating a plurality of annular thin plate in the direction of rotation axis 13, each thin plate being formed by punching a thin magnetic steel sheet. At the center of core 12, a through hole 16 extending along rotation axis 13 is formed. Through hole 16 receives rotation shaft 11. On or near the outer periphery surface of core 12 defined about rotation axis 13, a plurality of slot holes 17 are formed in core 12 at regular intervals about rotation axis 13. Slot holes 17 extend parallel to rotation axis 13. Slot holes 17 extend through core 12 in the direction of rotation axis 13. Conductive bars 15 as described above are positioned in slot holes 17. Conductive bars 15 connect the pair of conductive end rings 14a, 14b to each other.

At the center of conductive end rings 14a, 14b, a through hole 18 is formed along rotation axis 13. Through hole 18 receives rotation shaft 11. In relation to lower conductive end ring 14b, on or near the outer periphery surface of end ring 14b defined about rotation axis 13, a plurality of through holes 19 are formed at regular intervals about rotation axis 13. Through holes 19 are formed at positions corresponding to the positions of slot holes 17, and extend through end ring 14b in the direction of rotation axis 13. Through holes 19 receive lower ends of conductive bars 15.

It is preferable that an upper end of each conductive bar 15 is positioned at a surface which is flush with an upper surface of core 12. However, the present invention is not limited to such a configuration. The upper end of each conductive bar 15 is connected to upper end ring 14a. On the other hand, it is preferable that a lower end of each conductive bar 15 is positioned at a surface which is flush with an lower surface of lower end ring 14b. However, the present invention is not limited to such a configuration. The lower end of each conductive bar 15 is connected to lower end ring 14b. A cross-sectional shape of conductive bar 15 generally corresponds to a cross-sectional shape of slot hole 17. Conductive end rings 14a, 14b and conductive bars 15 are formed from conductive material such as copper, copper alloy, aluminum or aluminum alloy. The method for forming the conductive end rings and bars will be explained below.

Figure 3:
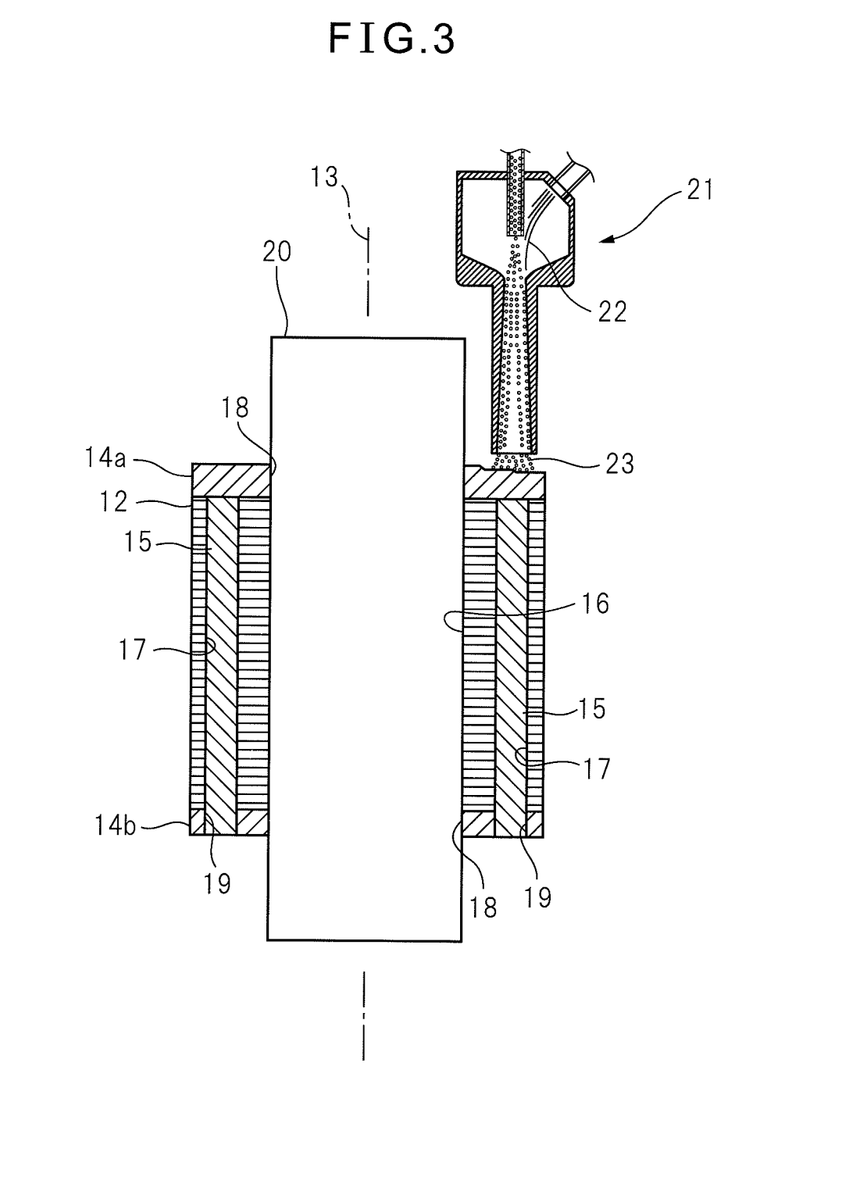
FIG. 3 is a sectional view schematically showing a production process of the squirrel-cage rotor according to the first embodiment of the invention.

Next, a production method of squirrel-cage rotor 10 is explained. First, an assembly of core 12 is provided. When forming core 12 (i.e., the laminate of magnetic steel sheets), a fixture 20 (for example, a column-shaped fixture) is used. Conductive end ring 14b is positioned at the lower end of core 12. Then, conductive bars 15 are positioned in clot holes 17 of core 12. The lower ends of conductive bars 15 are positioned in through holes 19 of end ring 14b. In this embodiment, conductive end ring 14b and conductive bars 15 are previously formed in predetermined shapes by, for example, machining process. Conductive material, such as copper, is used as material of end ring 14b and conductive bars 15.

Next, upper end ring 14a is formed by cold spraying process. When the cold spraying process is carried out, a Laval nozzle 21 is used, as shown in FIG. 3. In Laval nozzle 21, a flow channel, which spreads toward an outlet at a front end of the nozzle, is formed. In the flow channel, supersonic gas 22 is introduced toward the front end. For example, a flow rate of gas 22 is set at 300 to 1200 m/s. In the flow of gas 22, conductor particles 23 are mixed. The temperature of gas 22 is set to be lower than the melting point or the softening temperature of conductor particles 23. Conductive material, such as copper, is used as material of conductor particles 23. For example, a particle diameter of each conductor particle 23 is set at 1 to 50 μm. For example, the temperature of gas 22 is set at normal temperature to 500 degrees C.

In the embodiment, Laval nozzle 21 is positioned along rotation axis 13. The front end of Laval nozzle 21 faces the upper surface of core 12. Conductor particles 23 in the supersonic flow are blown out from the front end of Laval nozzle 21. The blown conductor particles are sprayed on core 12 and/or conductive bars 15. Since the temperature of gas 22 is set to be lower than the melting point of conductor particles 23, conductor particles 23 collide with core 12 and/or conductive bars 15 in a solid-state. As such, a coating of the conductor is formed on the upper surface of core 12 and/or the upper surfaces of conductive bars 15. By the rotational movement of Laval nozzle 21 about rotation axis 13, or by the rotation of core 12 about rotation axis 13, a coating material having a predetermined thickness, i.e., conductive end ring 14a, is formed on the upper surface of core 12.

In such cold spraying process, due to the collision of conductor particles 23 against core 12 and conductive bars 15, a layer of coating is formed on core 12 and conductive bars 15. As a result, conductive end ring 14a is connected to core 12 and conductive bars 15, simultaneously with the forming of conductive end ring 14a. Then, conductor particles 23 are sprayed toward the gap between lower end ring 14b and conductive bars 15 by cold spraying process. As a result, a coating of conductor particles 23 is formed between the inner surface of through hole 19 of end ring 14b and the outer periphery surface of conductive bar 15. In such a manner, lower conductive end ring 14b and conductive bars 15 are connected to each other. Then, fixture is removed from core 12. In addition, a surface of fixture 20 may be treated so that the coating hardly adheres to the fixture.

As explained above, according to the present invention, conductor particles 23 is mixed in gas 22, the temperature of which is lower than the melting point of the particles, and thus the conductor particles 23 are sprayed to core 12 and/or conductive bars 15 in the solid-state. As a result, in the formed coating, the enlargement of the crystal grain of the conductors is significantly restricted. In addition, a layer of coating having fine conductors may be formed. As a result, conductive end ring 14a is assuredly connected to core 12 and/or conductive bars 15. Further, since the conductor does not melt, a gap between different kinds of members is prevented from being formed, wherein the gap may be formed by thermal contraction when the conductor melts. As a result, the deterioration of the conductor may be limited, whereby the sufficient strength of the conductor may be obtained, and the reliability of squirrel-cage rotor 10 may be improved. Further, the cold spraying process may be carried out by using relatively compact equipment, and thus may be carried out at low cost.

On the other hand, in thermal spraying, die-casting or brazing of the prior art, the conductor melt. As a result, the strength of the conductor is lowered due to the enlargement of the crystal grain of the conductor. Further, in the die-casting, a cavity or void may be generated in the casted conductor. Such a cavity or void may further deteriorate the strength of the conductor. The brazing requires advanced techniques, and the strength of the conductor may be lowered by stress concentration at a brazed portion when the brazing thereof is insufficient or inappropriate. The lowered strength as such may decrease the reliability of the product. In the thermal spraying, the density of the conductor is lowered by 5% in comparison to the clod spraying, and the rigidity of the conductor may be partially lowered, resulting in the decrease of the reliability of the product (Itoh et al.). Further, the die-casting and the brazing use relatively massive equipment, and thus are costly. In addition, in the plating of the conductor as described in Japanese Patent Publication No. 4560755, a coating having the thickness of several millimeters or more is formed, which takes a lot of time and thus is inefficient.

Figure 4:
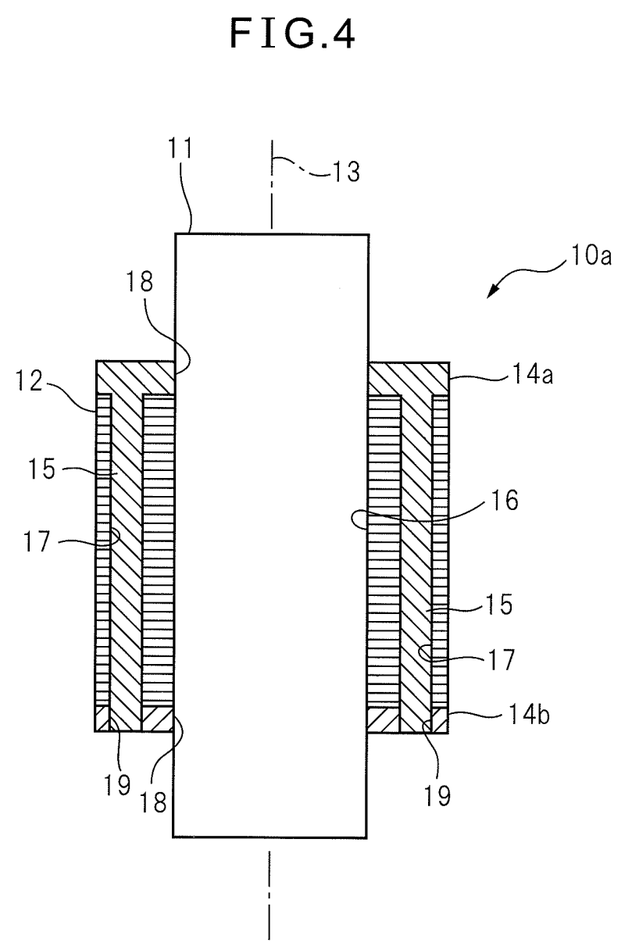
FIG. 4 is a sectional view of a squirrel-cage rotor according to a second embodiment of the invention, along a rotation axis thereof.

FIG. 4 is a sectional view of a squirrel-cage rotor 10a according to a second embodiment of the invention, along a rotation axis 13 of rotor 10a. The same reference numerals are added to components of rotor 10a, which are equivalent to the components of rotor 10. Rotor 10a is attached to rotation shaft 11, similarly to the above. In rotor 10a, conductive bars 15 are formed by the cold spraying process, as well as upper conductive end ring 14a. As a result, conductive end ring 14a and conductive bars 15 are integrally formed. Through holes 19 are formed in lower conductive end ring 14b, similarly to the above. In other words, as conductive end ring 14b, a processed product, which is machined in a predetermined shape, is used. The lower ends of conductive bars 15 are positioned within through holes 19.

Figure 5:
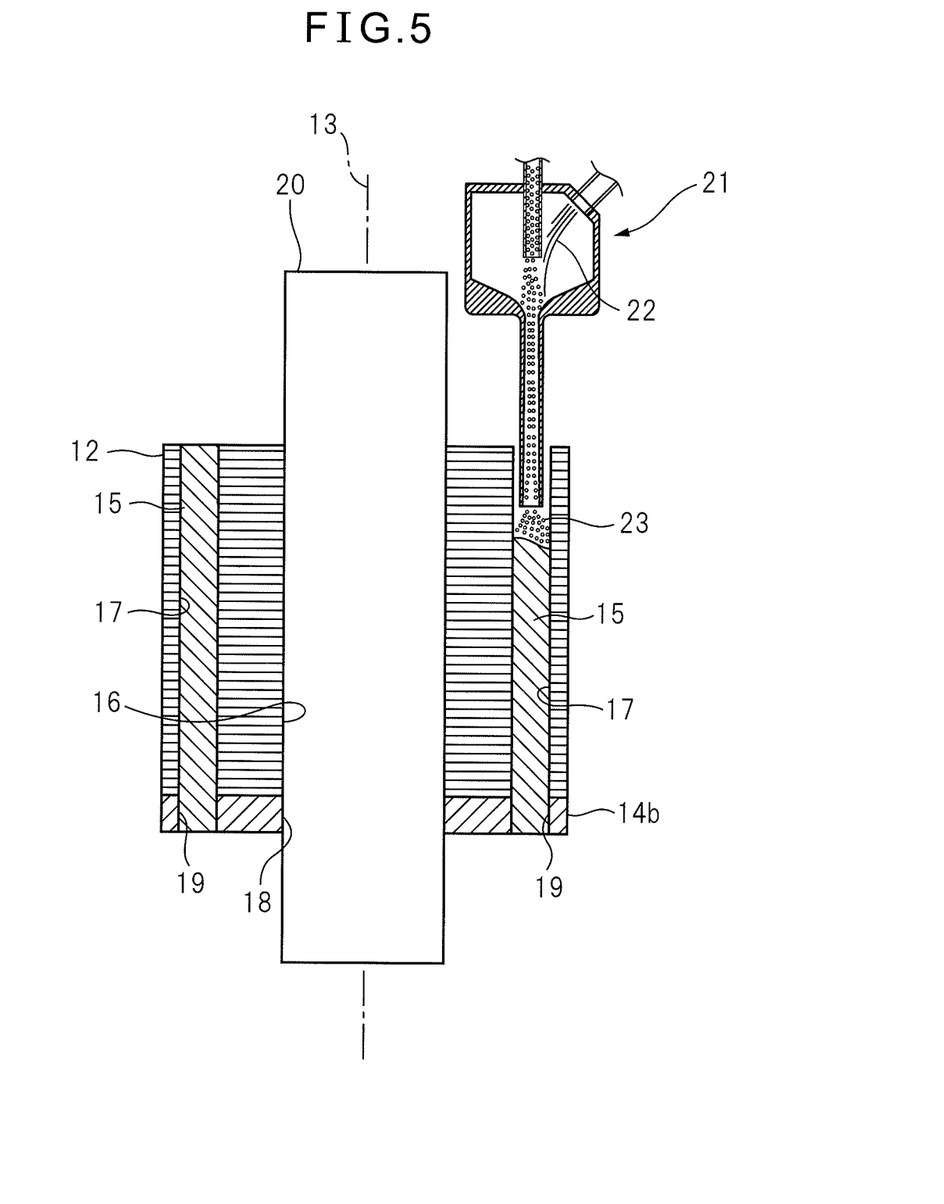
FIG. 5 is a sectional view schematically showing a production process of the squirrel-cage rotor according to the second embodiment of the invention.

In producing squirrel-cage rotor 10a, conductive end ring 14b is attached to the assembly of core 12 mounted to fixture 20, similarly to the above. Then, as shown in FIG. 5, Laval nozzle 21 is inserted into each slot hole 17 of core 12. At this time, the lower end surface of end ring 14b is blocked or closed by a jig (not shown) or the like. Conductor particles 23 are sprayed into each slot hole 17 by the cold spraying process. Due to the movement of Laval nozzle 21 along rotation axis 13, a layer of coating is formed in slot hole 17. In such a manner, the coating material (i.e., conductive bar 15) are formed in each slot 17.

Next, Laval nozzle 21 is positioned parallel to rotation axis 13. Similarly to the above, the coating material (i.e., conductive end ring 14a) is formed at the upper surface of core 12 by the cold spraying process. According to the production method of squirrel-cage rotor 10a, the same function and effect as the above may be realized. In addition, in squirrel-cage rotor 10a, the forming of through holes 19 at lower end ring 14b may be omitted. When the forming of through holes 19 is omitted, it is not necessary to block or close the through holes of end ring 14b by means of a jig during the spraying of conductor particles 23 into slot hole 17.

Figure 6:
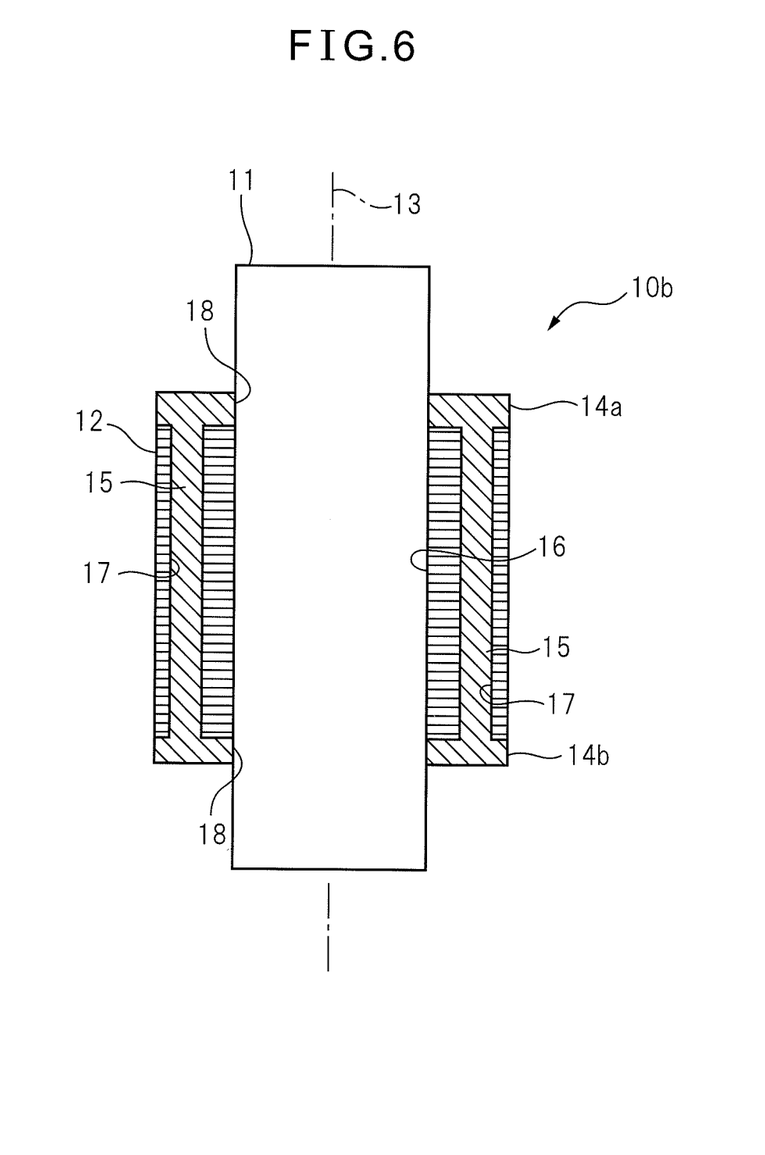
FIG. 6 is a sectional view of a squirrel-cage rotor according to a third embodiment of the invention, along a rotation axis thereof.

FIG. 6 is a sectional view of a squirrel-cage rotor 10b according to a third embodiment of the invention, along a rotation axis 13 of rotor 10b. The same reference numerals are added to components of rotor 10 or 10a, which are equivalent to the components of rotor 10 or 10a. Rotor 10b is attached to rotation shaft 11, similarly to the above. In rotor 10b, lower conductive end ring 14b is formed by the cold spraying process, as well as upper conductive end ring 14a and conductive bars 15. As a result, conductive end rings 14a, 14b and conductive bars 15 are integrally formed. In addition, since a processed product, which is machined in a predetermined shape, is not used, through holes 19 are not formed in lower end ring 14b.

Figure 7:
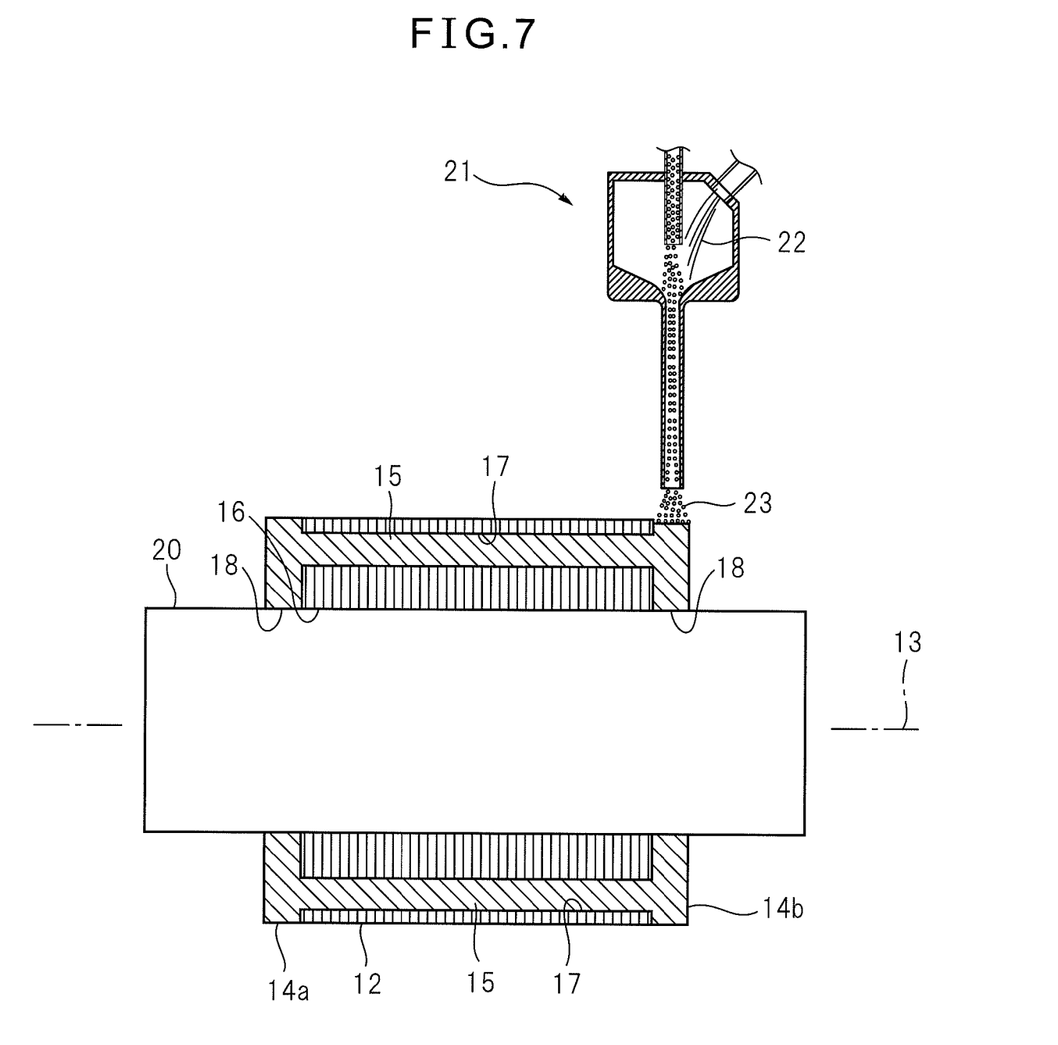
FIG. 7 is a sectional view schematically showing a production process of the squirrel-cage rotor according to the third embodiment of the invention.

In producing squirrel-cage rotor 10b, as shown in FIG. 7, Laval nozzle 21 is directed toward the outer periphery of rotor 10b. Rotor 10b is rotated about rotation axis 13, and conductor particles 23 are sprayed toward core 12 and rotation axis 13. As a result, the coating material (i.e., conductive end ring 14b) is formed at the lower surface of core 12. Then, similarly to the above, conductive bar 15 is formed in each slot hole 17. In the same manner as lower end ring 14b, upper conductive end ring 14a is formed at the upper end of core 12. Next, fixture 20 is removed from core 12. According to the production method of squirrel-cage rotor 10b, the same function and effect as the above may be realized.

Figure 8:
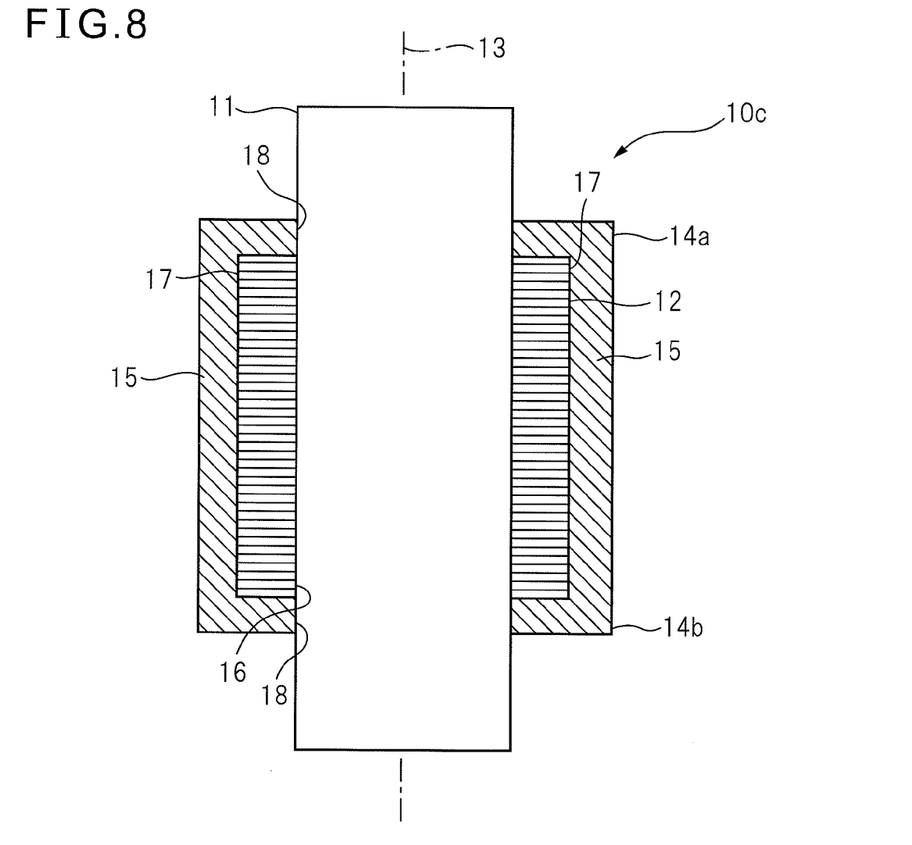
FIG. 8 is a sectional view of a squirrel-cage rotor according to a fourth embodiment of the invention, along a rotation axis thereof.
Figure 9:
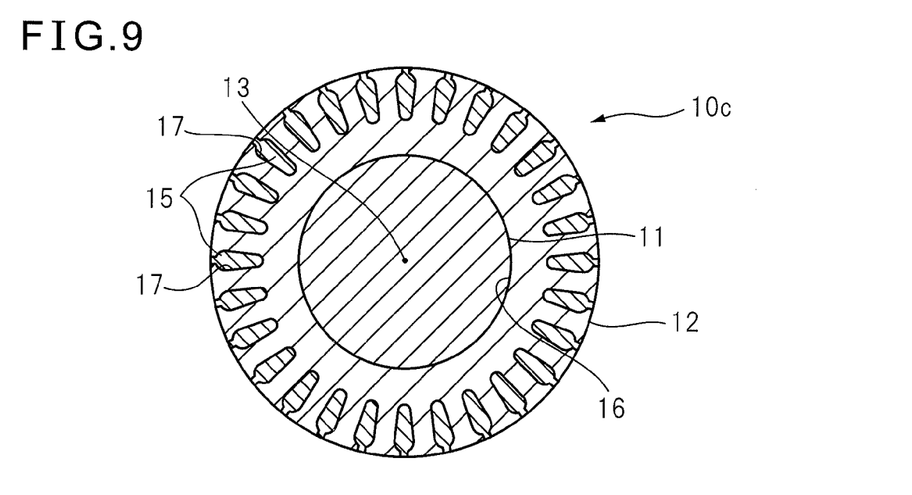
FIG. 9 is a sectional view of the squirrel-cage rotor according to the fourth embodiment of the invention, perpendicular to the rotation axis thereof.

FIG. 8 is a sectional view of a squirrel-cage rotor 10c according to a fourth embodiment of the invention, along a rotation axis 13 of rotor 10c, and FIG. 9 is a sectional view of rotor 10c, perpendicular to rotation axis 13 of rotor 10c. The same reference numerals are added to components of rotor 10, 10a or 10b, which are equivalent to the components of rotor 10, 10a or 10b. Rotor 10c is attached to rotation shaft 11, similarly to the above. In squirrel-cage rotor 10c, the outer ends of slot holes 17 are opened at the outer end of core 12. As a result, conductive bars 15 are exposed at the outer periphery surface of core 12. In rotor 10c, conductive end rings 14a, 14b and conductive bars 15 are integrally formed by the cold spraying process.

Figure 10:
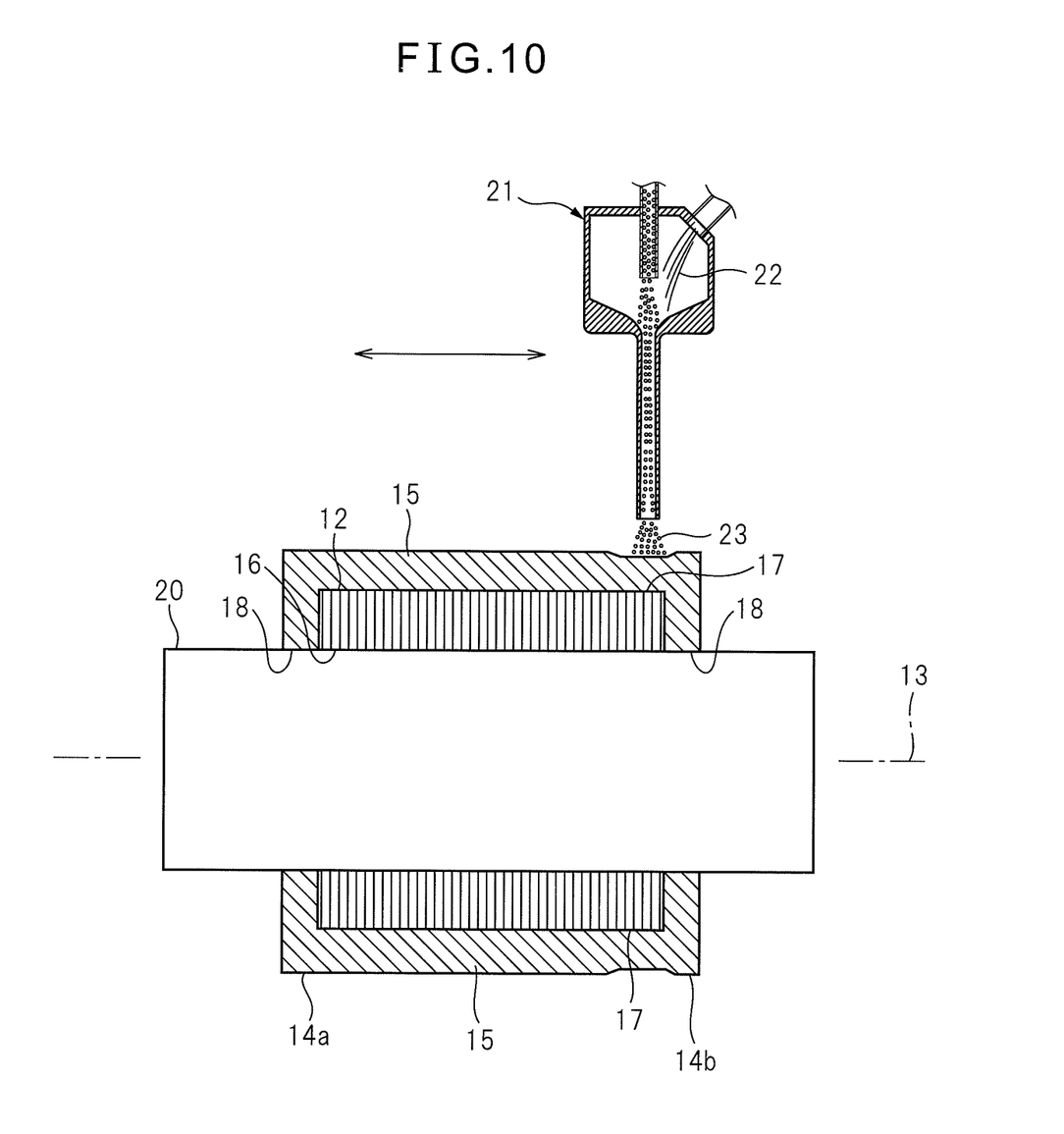
FIG. 10 is a sectional view schematically showing a production process of the squirrel-cage rotor according to the fourth embodiment of the invention.

In producing squirrel-cage rotor 10c, similarly to the above, Laval nozzle 21 is directed toward the outer periphery of rotor 10c, and Laval nozzle 21 is rotated about rotation axis 13. Next, conductor particles 23 are sprayed toward core 12 and rotation axis 13. As a result, conductive end rings 14a, 14b are formed at the upper and lower ends of core 12, respectively. Then, as shown in FIG. 10, Laval nozzle 21 is moved along the outer periphery surface of core 12, in the direction of each slot hole 17 and parallel to rotation axis 13. As a result, the coating material or conductive bar 15 is formed in each slot hole 17. In the same manner as lower end ring 14b, upper conductive end ring 14a is formed at the upper end of core 12. After that, fixture 20 is removed from core 12. According to the production method of squirrel-cage rotor 10c, the same function and effect as the above may be realized.

In squirrel-cage rotors 10, 10a, 10b and 10c as explained above, a skew may be formed in core 12. In core 12, each slot hole 17 spirally extends about rotation axis 13. In other words, an angular position of each slot hole 17 about rotation axis 13 is gradually varied as each slot hole 17 extends from the upper end to the lower end along rotation axis 13. According to the production method of the present invention, Laval nozzle 21 may be inserted in to such slot hole 17, and thus conductive bar 15 may be assuredly formed in each slot hole 17.

According to the squirrel-cage rotor and the production method thereof, the conductor of the rotor has sufficient strength.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A squirrel-cage rotor, comprising:
   a core;
   a plurality of slot holes formed in the core and extending along a rotation axis of the core;
   conductive bars arranged in the slot holes; and
   a pair of conductive end rings arranged at both ends of the core defined in relation to a direction of the rotation axis of the core and connected to each other by the conductive bars,
   wherein the slot holes are opened at an outer periphery surface of the core, the conductive bars are formed by a coating material which is formed by spraying solid-state conductor particles into the slot holes from the side of the outer periphery surface of the core, and
   wherein at least one of the pair of conductive end rings is configured by a coating material which is formed by a cold spraying process in which solid-state conductor particles are sprayed.

2. The squirrel-cage rotor as set forth in claim 1, wherein the conductive end rings are formed by the coating material of the conductor particles which are sprayed to the core and the rotation axis from the side of the outer periphery surface of the core.

3. The squirrel-cage rotor as set forth in claim 1, wherein the conductive end rings are formed by the coating material of the conductor particles which are sprayed from the side of an end surface of the core.

4. The squirrel-cage rotor as set forth in claim 1, wherein the slot holes spirally extend about the rotation axis.

5. A production method of a squirrel-cage rotor including: a core; a plurality of slot holes formed in the core and extending along a rotation axis of the core; conductive bars arranged in the slot holes; and a pair of conductive end rings arranged at both ends of the core defined in relation to a direction of the rotation axis of the core and connected to each other by means of the conductive bars,
   wherein the method comprises the steps of
      forming the conductive bars by a coating material which is formed by spraying solid-state conductor particles from the side of an outer periphery surface of the core into the slot holes which are opened at the outer periphery surface of the core; and
      configuring at least one of the pair of conductive end rings by a cold spraying process in which solid-state conductor particles are sprayed so as to form a coating material.

6. The production method as set forth in claim 5, wherein the conductor particles are sprayed to the core and the rotation axis from the side of the outer periphery surface of the core when the conductive end rings are formed.

7. The production method as set forth in claim 5, wherein the conductor particles are sprayed from the side of an end surface of the core when the conductive end rings are formed.

8. The production method as set forth in claim 5, wherein the slot holes spirally extend about the rotation axis.

9. The squirrel-cage rotor as set forth in claim 1, wherein the conductive bars are positioned radially outside a column shaped fixture.

10. The squirrel-cage rotor as set forth in claim 1, wherein the slot holes extend through the core.

11. The production method as set forth in claim 5, wherein the conductive bars are positioned radially outside a column shaped fixture.

12. The production method as set forth in claim 5, wherein the slot holes extend through the core.

* * * * *